United States Patent
Volpone et al.

(10) Patent No.: US 9,954,347 B1
(45) Date of Patent: Apr. 24, 2018

(54) WIRE HARNESS ASSEMBLY AND SEAL RETAINER THEREFORE

(71) Applicant: Delphi Technologies, Inc., Troy, MI (US)

(72) Inventors: Thomas A. Volpone, Cortland, OH (US); Troy A. Iler, Salem, OH (US)

(73) Assignee: Delphi Technologies, Inc.

( * ) Notice: Subject to any disclaimer, the term of this patent is extended or adjusted under 35 U.S.C. 154(b) by 0 days.

(21) Appl. No.: 15/626,701

(22) Filed: Jun. 19, 2017

(51) Int. Cl.
*H02G 3/04* (2006.01)
*H01B 7/00* (2006.01)

(52) U.S. Cl.
CPC ......... *H02G 3/0406* (2013.01); *H01B 7/0045* (2013.01); *H02G 3/0462* (2013.01)

(58) Field of Classification Search
None
See application file for complete search history.

(56) References Cited

U.S. PATENT DOCUMENTS

| | | | | |
|---|---|---|---|---|
| 5,283,807 A | * | 2/1994 | Graham | H04B 15/04 375/130 |
| 5,541,365 A | * | 7/1996 | Sugiura | B23K 26/06 174/70 R |
| 5,603,624 A | * | 2/1997 | Taguchi | H01R 13/62933 439/157 |
| 5,695,349 A | * | 12/1997 | Taguchi | H01R 13/62938 439/157 |
| 5,797,758 A | * | 8/1998 | Tsuchiya | H01R 13/62933 439/157 |
| 5,806,139 A | * | 9/1998 | Anderson | B60R 16/0222 16/2.1 |
| 5,928,011 A | * | 7/1999 | Flask | H01R 13/4362 439/157 |
| 5,965,847 A | * | 10/1999 | Tanaka | H01R 9/0527 174/84 R |
| 5,997,321 A | * | 12/1999 | Nakata | H01R 13/62933 439/157 |
| 6,051,794 A | * | 4/2000 | Katou | B60R 16/0222 174/151 |
| 6,114,630 A | * | 9/2000 | Gretz | H05K 13/00 174/51 |
| 6,133,529 A | * | 10/2000 | Gretz | F16L 37/008 16/2.1 |
| 6,150,608 A | * | 11/2000 | Wambeke | G02B 6/4428 16/2.1 |

(Continued)

*Primary Examiner* — Timothy Thompson
*Assistant Examiner* — Muhammed Azam
(74) *Attorney, Agent, or Firm* — Robert J. Myers

(57) ABSTRACT

A wire harness assembly includes a housing defining an interior volume which extends into the housing along an axis and also defines an outer surface having a retention protuberance extending outward therefrom. A seal is received within the interior volume and a wire extends through the seal into the interior volume. A seal includes skirt segments which extend from the seal retainer wall such that each of the skirt segments is positioned laterally to the outer surface and such that one of the skirt segments is a lock arm having a lock aperture which captures the retention protuberance therein, thereby retaining the seal retainer to the housing. A flex limiting strap joins the lock arm to an adjacent one of the skirt segments and limits the extent to which the lock arm flexes away from the axis.

9 Claims, 3 Drawing Sheets

(56) References Cited

U.S. PATENT DOCUMENTS

| | | | | |
|---|---|---|---|---|
| 6,335,488 B1 * | 1/2002 | Gretz | H02G 3/0691 | 16/2.1 |
| 6,362,427 B1 * | 3/2002 | Daoud | H02G 3/085 | 174/152 G |
| 6,426,462 B1 * | 7/2002 | Mignon | G02B 6/4451 | 138/150 |
| 6,441,305 B1 * | 8/2002 | Dong | H02G 15/013 | 16/2.2 |
| 6,485,332 B1 * | 11/2002 | Kwang | H01R 13/443 | 439/587 |
| 6,521,831 B1 * | 2/2003 | Gretz | H01R 13/745 | 174/153 R |
| 6,538,201 B1 * | 3/2003 | Gretz | H02G 3/0691 | 16/2.1 |
| 6,642,451 B1 * | 11/2003 | Gretz | F16L 33/227 | 16/2.1 |
| 6,825,416 B2 * | 11/2004 | Okuhara | B60R 16/0222 | 174/151 |
| 6,843,670 B2 * | 1/2005 | Yamaguchi | G06K 13/08 | 439/157 |
| 6,916,988 B1 * | 7/2005 | Auray | H02G 3/0691 | 174/665 |
| 7,057,107 B2 * | 6/2006 | Auray | H02G 3/0691 | 174/657 |
| 7,060,900 B1 * | 6/2006 | Gretz | | 16/2.1 |
| 7,064,272 B2 * | 6/2006 | Auray | F16L 5/00 | 174/657 |
| 7,075,007 B2 * | 7/2006 | Auray | F16L 5/00 | 174/656 |
| 7,151,223 B2 * | 12/2006 | Auray | H01R 4/646 | 174/70 R |
| 7,154,042 B2 * | 12/2006 | Auray | H01R 4/646 | 174/70 R |
| 7,205,489 B2 * | 4/2007 | Auray | H01R 4/646 | 174/650 |
| 7,214,890 B2 * | 5/2007 | Kiely | H02G 3/0683 | 174/659 |
| 7,238,050 B2 * | 7/2007 | Sakakura | H01R 9/032 | 439/157 |
| 7,390,980 B1 * | 6/2008 | Gretz | H02G 3/06 | 16/2.1 |
| 7,488,905 B2 * | 2/2009 | Kiely | H01R 13/745 | 174/650 |
| 7,868,251 B2 * | 1/2011 | Gladd | H01R 13/5205 | 174/72 A |
| 8,253,043 B1 * | 8/2012 | Kiely | H02G 3/0616 | 174/650 |
| 8,274,000 B2 * | 9/2012 | Smith | H02G 3/0616 | 174/552 |
| 8,350,163 B2 * | 1/2013 | Auray | H02G 3/0691 | 174/650 |
| 8,487,197 B2 * | 7/2013 | Smith | H02G 3/0691 | 174/552 |
| 9,543,747 B2 | 1/2017 | Dew et al. | | |
| 2004/0266265 A1 * | 12/2004 | Hayashi | H01R 13/5221 | 439/607.53 |
| 2007/0087621 A1 * | 4/2007 | Fukushima | H01R 9/0524 | 439/460 |
| 2007/0097667 A1 * | 5/2007 | Armstrong | H02G 3/088 | 362/101 |
| 2007/0264868 A1 * | 11/2007 | Wolf | H01R 13/639 | 439/505 |
| 2007/0278006 A1 * | 12/2007 | Gardner | H01R 24/564 | 174/659 |
| 2008/0053680 A1 * | 3/2008 | Kiely | H02G 3/0683 | 174/70 R |
| 2008/0277160 A1 * | 11/2008 | Auray | F16L 5/00 | 174/659 |
| 2010/0279530 A1 * | 11/2010 | Auray | H02G 3/065 | 439/157 |
| 2010/0307794 A1 * | 12/2010 | Baydoun | H02G 3/22 | 174/152 G |
| 2015/0295352 A1 * | 10/2015 | Kim | H01R 13/62938 | 439/157 |
| 2015/0357085 A1 * | 12/2015 | Kinsey | H01B 7/40 | 174/70 R |
| 2016/0180989 A1 * | 6/2016 | Nakai | H02G 3/0418 | 174/72 A |

* cited by examiner

WIRE HARNESS ASSEMBLY AND SEAL RETAINER THEREFORE

TECHNICAL FIELD OF INVENTION

The present invention relates a wire harness assembly; more particularly to a wire harness assembly having a housing which receives a seal and a seal retainer which retains the seal within the housing; and even more particularly to such a wire harness assembly where the seal retainer includes a lock arm which engages a complementary protuberance of the housing to retain the seal retainer to the housing.

BACKGROUND OF INVENTION

Wire harness assemblies of a variety of configurations are employed in systems for transmitting electric current or electrical signals from one device or location to another device or location. It is known for a wire harness assembly to include a housing into which one or more wires extends such that the one or more wires may terminate within the housing in order to facilitate connection with a complementary portion of the wire harness, i.e. a mating connector, or the one or more wires may be spliced together within the housing such that the housing provides protection to the termination or splice. It is also known to provide a seal at an interface where the one or more wires enter the housing in order to prevent contaminants such as water, dust, and dirt that are present outside of the housing from entering the housing at the interface. The seal is typically received within a recess of the housing and one or more apertures are provided through the seal in order to allow the one or more wires to pass therethrough to enter the housing. Consequently, inner peripheries of the one or more apertures are sealed to the one or more wires and an outer periphery of the seal is sealed to the housing. A seal retainer is provided in order to ensure that the seal remains properly positioned within the housing, thereby ensuring that the seal is able to carry out its intended function. One such seal retainer is illustrated U.S. Pat. No. 9,543,747 to Dew et al. where the seal retainer includes a pair of lock arms with apertures therethrough which engage complementary lock protuberances that extend outward from the housing. The lock arms are flexible and resilient in order to allow the lock arms to lift over the lock protuberances during installation of the seal retainer to the housing and also during disassembly of the seal retainer from the housing. The lock protuberances typically include ramp surfaces, as illustrated by Dew et al., which automatically flex the lock arms only by the required amount during assembly of the seal retainer to the housing. However, disassembly of the seal retainer from the housing requires that outward forces be applied to the lock arms in order to displace the lock arms sufficiently far to clear the lock protuberances, thereby allowing the seal retainer to be slid free from of the housing. The forces applied to the lock arms may be provided by a human finger or a screwdriver or similar tool to pry the lock arms free of the lock protuberances. However, if care is not taken, the lock arms may be displaced sufficiently far so as to exceed the elastic limit of the lock arms, thereby preventing the lock arms from returning to their original position after the forces have been released from the lock arms. If the elastic limit of the lock arms has been exceeded, the lock arms may no longer properly engage the lock protuberances upon assembly of the seal retainer to the housing, thereby rendering the seal retainer ineffective for retaining the seal within the housings. Furthermore, if the elastic limit of the lock arms has been exceeded, significant rework of the wire harness assembly may be necessary in order to replace the damaged seal retainer.

What is needed is a wire harness assembly which minimizes or eliminates one or more of the shortcomings as set forth above.

SUMMARY OF THE INVENTION

Briefly described, a wire harness assembly includes a housing defining an interior volume which extends into the housing along an axis, the interior volume having an interior surface having an interior perimeter, the housing also defining an outer surface having a retention protuberance extending outward therefrom; a seal received within the interior volume which engages the interior perimeter of the interior surface, the seal having a wire aperture extending therethrough; a wire extending through the wire aperture of the seal such that the wire aperture circumferentially engages the wire; and a seal retainer having a seal retainer wall which traverses the axis and which retains the seal within the interior volume, the seal retainer also having a seal retainer skirt which is defined by a plurality of skirt segments which extend from the seal retainer wall such that each of the plurality of skirt segments is positioned laterally to the outer surface; wherein one of the plurality of skirt segments defines a lock arm having a lock aperture which captures the retention protuberance therein, thereby retaining the seal retainer to the housing and limiting motion of the seal retainer relative to the housing along the axis, the lock arm being resilient and compliant which allows the lock arm to flex away from the axis, thereby allowing the lock arm to lift over the retention protuberance when the seal retainer is being installed on the housing and when the seal retainer is being removed from the housing, the seal retainer having a flex limiting strap joining the lock arm to an adjacent one of the plurality of skirt segments which limits the extent to which the lock arm flexes away from the axis. Since the flex limiting strap limits the extent to which the lock arm flexes away from the axis, over-flexing of the lock arm can be prevented which could otherwise exceed the elastic limit of the lock arm and prevent the lock arm from returning back to its original position which could prevent the lock arm from retaining the seal retainer to the housing.

BRIEF DESCRIPTION OF DRAWINGS

This invention will be further described with reference to the accompanying drawings in which.

DETAILED DESCRIPTION OF INVENTION

Figure 1:
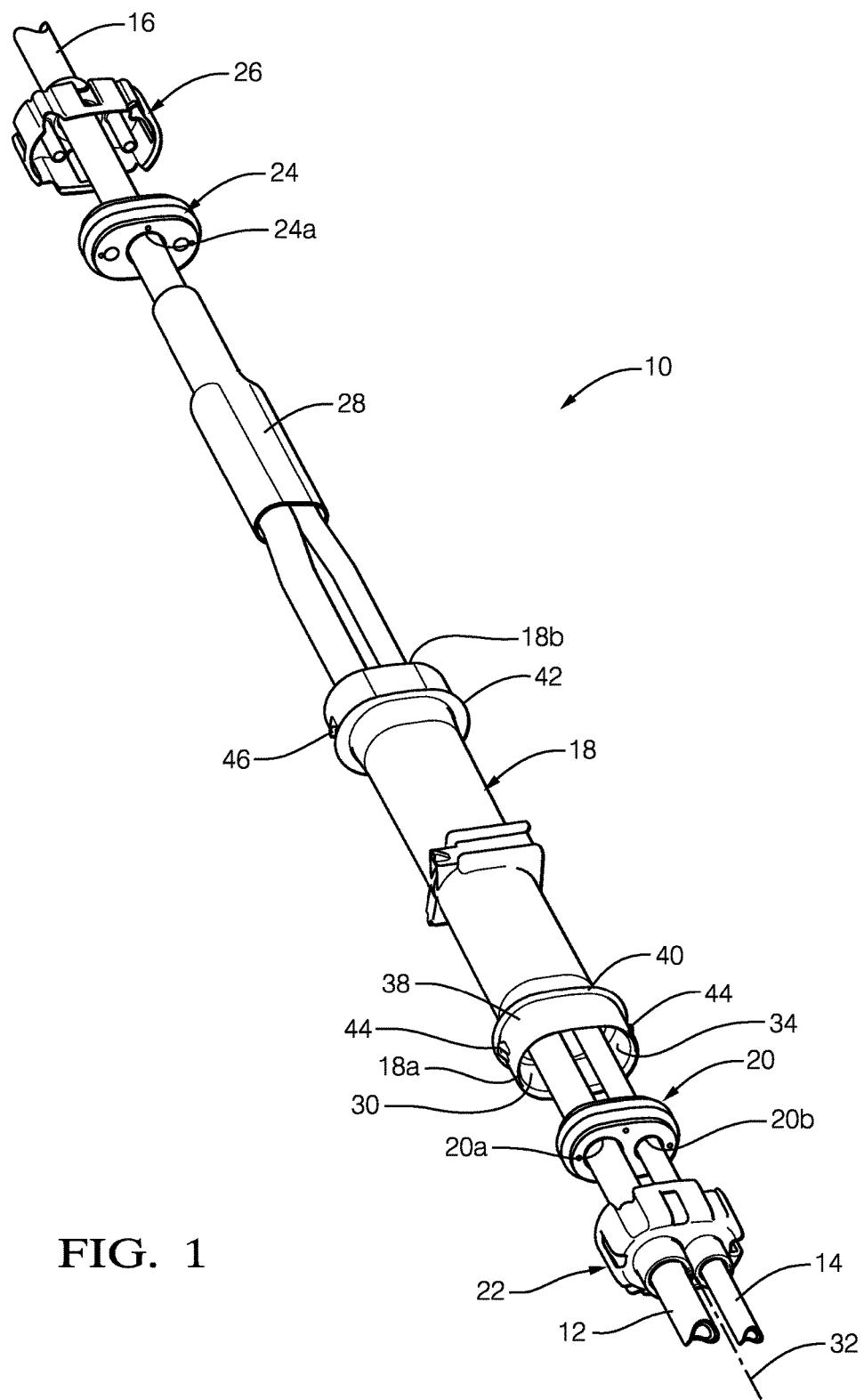
FIG. 1 an exploded isometric view of a wire harness assembly of the present invention.

In accordance with a non-limiting embodiment of the present invention and referring initially to FIG. 1, a wire harness assembly 10 is illustrated in an exploded isometric view. As embodied herein, by way of non-limiting example only, wire harness assembly 10 generally includes a first wire 12, a second wire 14, a third wire 16, a housing 18, a first seal 20, a first seal retainer 22, a second seal 24, and a second seal retainer 26. In particular, first seal retainer 22 and second seal retainer 26 are provided with features, as will be described in greater detail below, which prevent or minimize the likelihood of damaging first seal retainer 22 and second seal retainer 26 at least during disassembly from housing 18. In the paragraphs that follow, the individual elements of wire harness assembly 10 will be described in greater detail.

With regard to first wire 12, second wire 14, and third wire 16, referred to collectively as wires 12, 14, 16, each of wires 12, 14, 16 is a wire commonly known to those of ordinary skill in the art of electric current and electric signal transmission and will not be described in greater detail herein. However, in general, wires 12, 14, 16 may include a conductive portion (not shown) which may be braided, stranded, or solid and which is used for transmitting an electric current or electric signal and may be, by way of non-limiting example copper, aluminum, alloys thereof or other materials which are suitable for communicating electricity as are well known to those of ordinary skill in the art. Wires 12, 14, 16 may also include one or more layers of electrical insulation (not shown) which electrically insulate the conductive portion, the material of which is commonly known to those of ordinary skill in the art. Wires 12, 14, 16 may also include a shield layer (not shown) which prevents ingress or egress of electromagnetic interference which could be disruptive to electronic devices in close proximity to wires 12, 14, 16 or which may be disruptive to electric signals that are being communicated through wires 12, 14, 16 as is well known to those of ordinary skill in the art. Wires 12, 14, 16 are spliced so as to place the conductive portion of each wires 12, 14, 16 in electrical communication with each other. Wires 12, 14, 16 may be spliced by any known method which may be, by way of non-limiting example only, ultrasonic welding, crimping and soldering and covered with a heat-shrink tubing to produce a splice 28 which is protected from environmental effects by being located within housing 18.

Housing 18 extends from a first end 18a to a second end 18b such that housing 18 is tubular, thereby defining an interior volume 30 which extends into housing 18 along an axis 32. Interior volume 30 is defined by an interior surface 34 of housing 18 such that interior surface 34 has an interior perimeter surrounding axis 32. Housing 18 also defines an outer surface 38 which opposes interior surface 34. Housing 18 is preferably an electrically insulative material, and may be, by way of non-limiting example only, a synthetic polymer, for example nylon or PBT, which may be net-formed by injecting a liquid polymer into a mold (not show) and then allowed to cool and solidify before being removed from the mold to yield housing 18 in finished form.

A first housing flange 40 is provided on outer surface 38 such that first housing flange 40 extends radially outward from housing 18 at a location that is axially spaced from first end 18a while a second housing flange 42 is provided on outer surface 38 such that second housing flange 42 extends radially outward from housing 18 at a location that is axially spaced from second end 18b. As shown, first housing flange 40 and second housing flange 42 are each substantially perpendicular to axis 32 and extend around the entire perimeter of outer surface 38, however, it should be understood that first housing flange 40 and second housing flange 42 may alternatively extend less than the entire perimeter of outer surface 38 and may be segmented. In this way, first housing flange 40 limits the extent to which first seal retainer 22 is slid onto housing 18 from first end 18a and second housing flange 42 limits the extent to which second seal retainer 26 is slid onto housing 18 from second end 18b.

Figure 2:
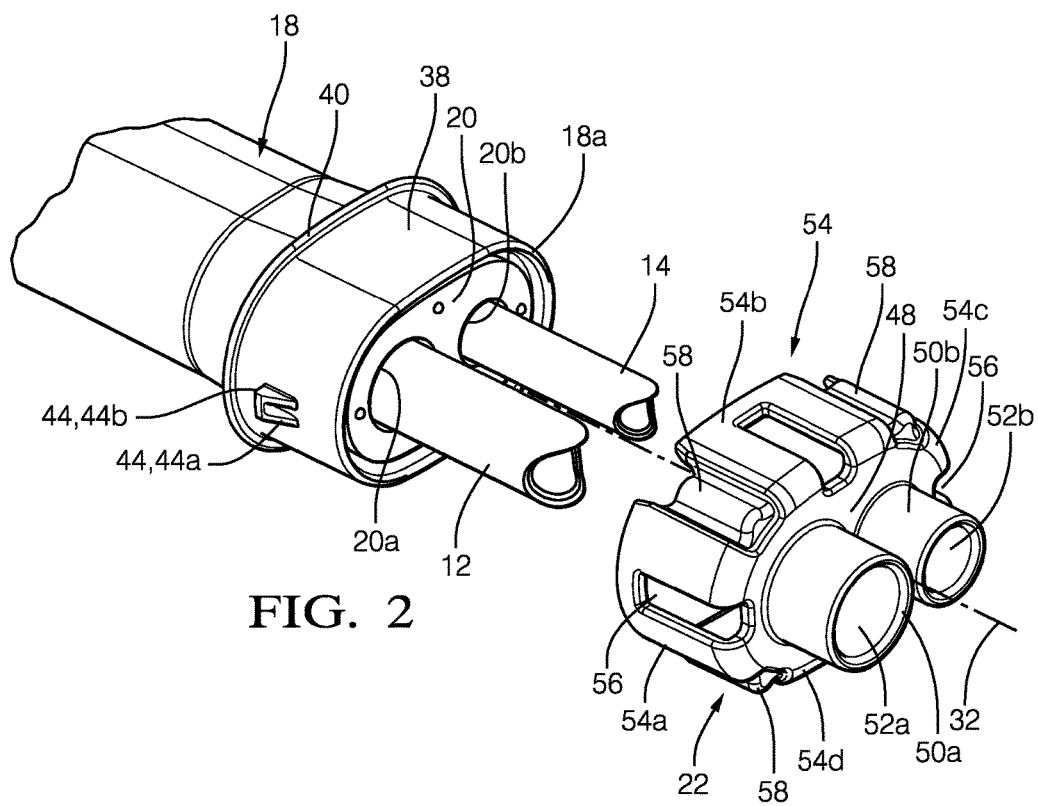
FIG. 2 is an enlarged portion of FIG. 1 shown with a seal of the wire harness assembly installed in a housing of the wire harness assembly.

With continued referenced to FIG. 1, and now with additional reference to FIG. 2, first retention protuberances 44, which are used to retain first seal retainer 22 to housing 18, are provided between first end 18a of housing 18 and first housing flange 40 such that each first retention protuberance 44 extends outward from outer surface 38. As shown, first retention protuberances 44 may be evenly spaced around the perimeter of outer surface 38, but may alternatively be unevenly spaced around the perimeter of outer surface 38. Also as shown, two first retention protuberances 44 are provided, however, a lesser or greater number may be provided depending on the retention needs of first seal retainer 22. First retention protuberances 44 include a ramp portion 44a which is inclined relative to axis 32 such that ramp portion 44a diverges from axis 32 when moving in a direction away from first end 18a toward first housing flange 40. First retention protuberances 44 also include a shoulder portion 44b which faces toward first housing flange 40 and which is preferably substantially perpendicular to axis 32. In this way, a channel is defined axially between first housing flange 40 and shoulder portion 44b.

Second retention protuberances 46 (only one second retention protuberance 46 is visible in the figures), which are used to retain second seal retainer 26 to housing 18, are provided between second end 18b of housing 18 and second housing flange 42 such that each second retention protuberance 46 extends outward from outer surface 38. second retention protuberances 46 may be substantially the same as first retention protuberances 44, consequently, for brevity, second retention protuberances 46 will not be described further herein.

First seal 20 is received within interior volume 30 and is complementary to interior surface 34 proximal to first end 18a such that first seal 20 engages the interior perimeter of interior surface 34 proximal to first end 18a. First seal 20 includes first wire apertures 20a, 20b extending therethrough in the direction of axis 32 such that first wire 12 extends through first wire aperture 20a and second wire 14 extends through first wire aperture 20b. First wire aperture 20a circumferentially engages first wire 12 and first wire aperture 20b circumferentially engages second wire 14. First seal 20 is made of a resilient and compliant material which may be, by way of non-limiting example only, a silicone-based rubber. In this way, contaminants such as, by way of non-limiting example only, water, dust, and dirt that are present outside of housing 18 are prevented from entering housing 18 at first end 18a, thereby providing protection to splice 28.

Second seal 24 is received within interior volume 30 and is complementary to interior surface 34 proximal to second end 18b such that second seal 24 engages the interior perimeter of interior surface 34 proximal to second end 18b. Second seal 24 includes second wire aperture 24a extending therethrough in the direction of axis 32 such that third wire 16 extends through second wire aperture 24a. Second wire aperture 24a circumferentially engages third wire 16. Second seal 24 is made of a resilient and compliant material which may be, by way of non-limiting example only, a silicone-based rubber. In this way, contaminants such as, by way of non-limiting example only, water, dust, and dirt that are present outside of housing 18 are prevented from entering housing 18 at second end 18b, thereby providing protection to splice 28.

Figure 3:
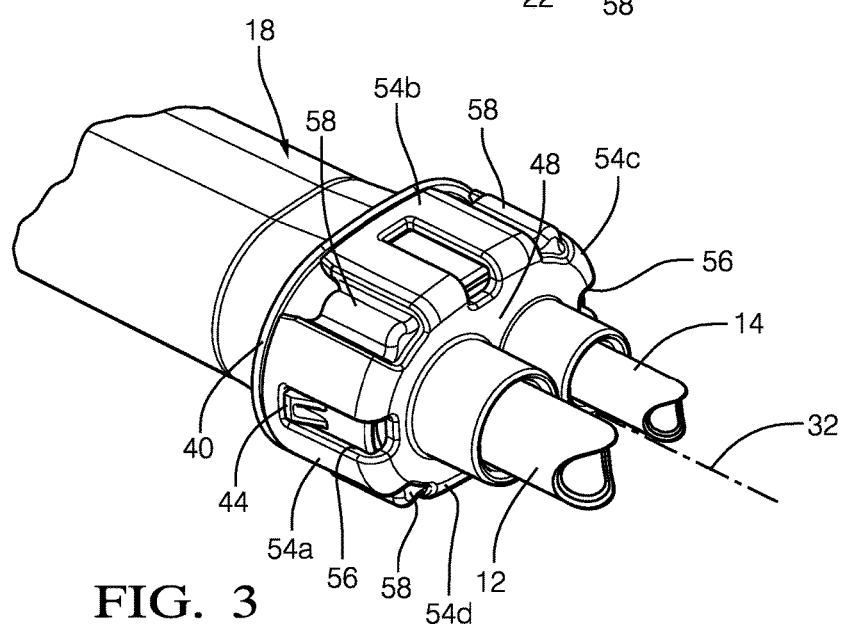
FIG. 3 is the view of FIG. 2 now shown with a seal retainer of the wire harness assembly installed on the housing.
Figure 4:
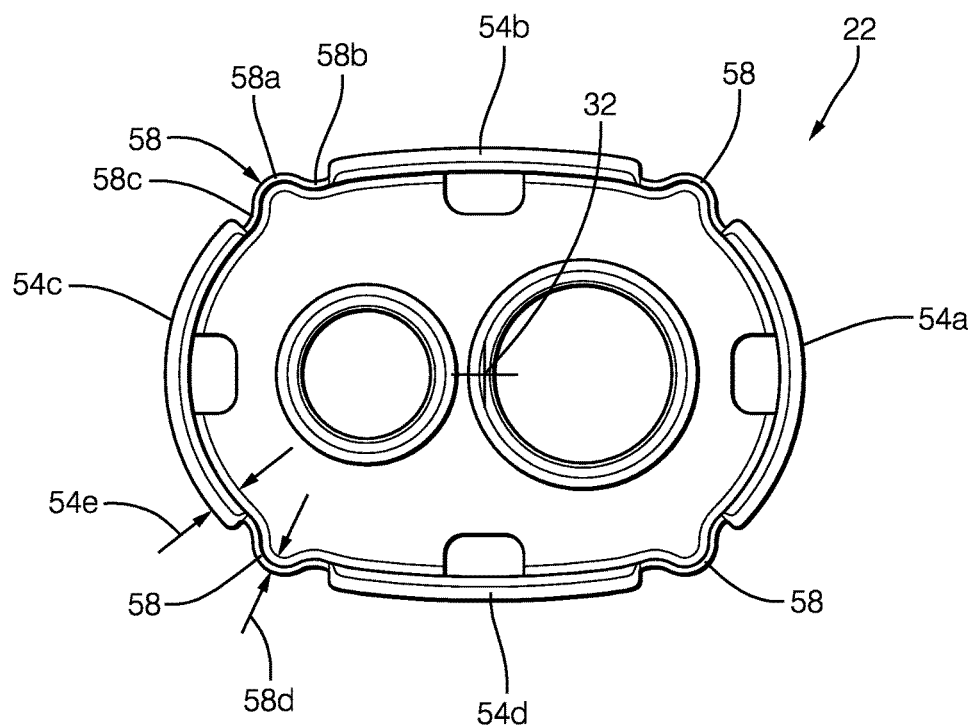
FIG. 4 is an elevation view of the seal retainer shown in a free state.
Figure 5:
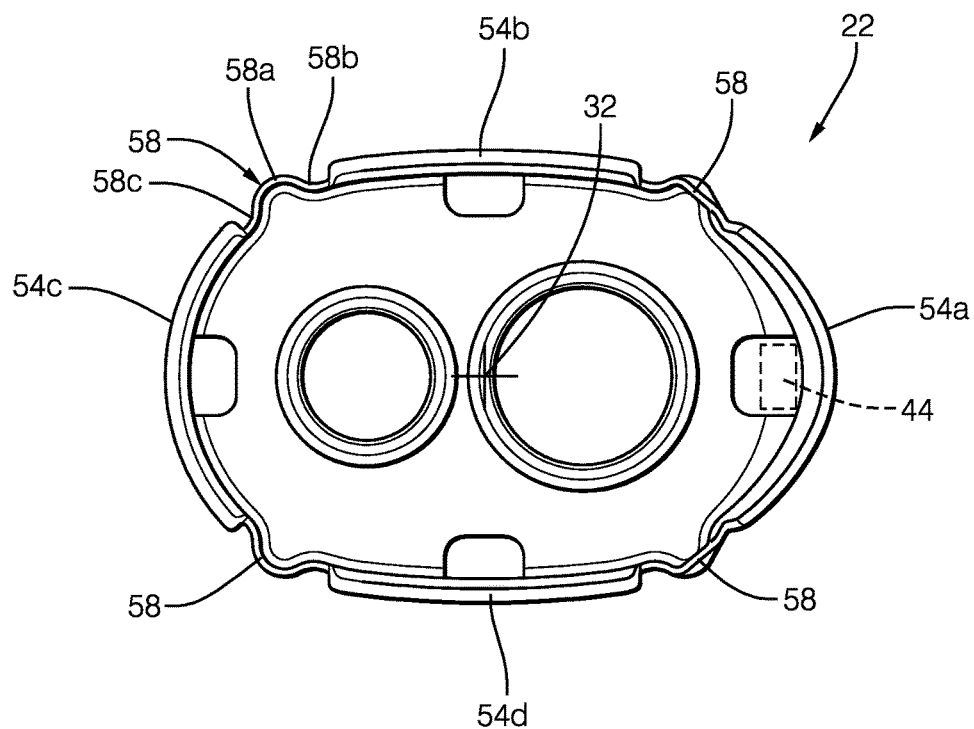
FIG. 5 is the elevation view of FIG. 4 now shown with one lock arm in free state and one lock arm in a flexed state.

With continued reference to FIGS. 1 and 2, and now with additional reference to FIGS. 3-5, first seal retainer 22 includes a seal retainer wall 48 which traverses axis 32 at first end 18a, thereby retaining first seal 20 within interior volume 30. As shown, seal retainer wall 48 may be substantially perpendicular to axis 32 and includes seal retainer wire towers 50a, 50b extending therefrom in a direction away from housing 18 and substantially parallel to axis 32. Seal retainer wire towers 50a, 50b include seal retainer wire apertures 52a, 52b respectively extending therethrough such that first wire 12 extends through seal retainer wire aperture 52a and second wire 14 extends through seal retainer wire aperture 52b.

First seal retainer 22 also includes a skirt 54 which is defined by a plurality of skirt segments 54a, 54b, 54c, 54d which extend from seal retainer wall 48 such that each skirt segment 54a, 54b, 54c, 54d is positioned laterally to the portion of outer surface 38 of housing 18 which lies between first end 18a and first housing flange 40. As illustrated herein, two skirt segments 54a, 54c are arranged to engage respective first retention protuberances 44, and consequently, skirt segments 54a, 54c are lock arms which are used to retain first seal retainer 22 to housing 18. Hereinafter, skirt segments 54a, 54c will be referred to as lock arms 54a, 54c. Lock arms 54a, 54c each have a lock aperture 56 extending therethrough in a direction which is substantially perpendicular to axis 32. Lock arms 54a, 54c are resilient and compliant which allows lock arms 54a, 54c to elastically flex away from axis 32 in order to allow for installation and removal of first seal retainer 22 on housing 18. In this way, when first seal retainer 22 is installed on housing 18 by sliding first seal retainer 22 over first end 18a in the direction of axis 32, first retention protuberances 44 elastically flex respective lock arms 54a, 54c away from axis 32 by riding up on ramp portion 44a of first retention protuberances 44 until first seal retainer 22 is installed on housing 18 sufficient far so as to align first retention protuberances 44 with respective lock aperture 56 of respective lock arms 54a, 54c, thereby allowing lock arms 54a, 54c to spring back into the pre-flexed state. Consequently, when lock arms 54a, 54c have sprung back into the pre-flexed state, first retention protuberances 44 are captured within respective lock aperture 56 of respective lock arms 54a, 54c, thereby retaining first seal retainer 22 to housing 18 since shoulder portion 44b of first retention protuberances 44 engages lock apertures 56 to limit motion of first seal retainer 22 relative to housing 18 in the direction of axis 32 and since a portion of each lock arm 54a, 54c is captured axially in the channel defined by first housing flange 40 and shoulder portion 44b.

In order to prevent over-flexing of lock arms 54a, 54c, particularly during removal of first seal retainer 22 from housing 18, flex limiting straps 58 are provided which join lock arms 54a, 54c to their adjacent skirt segments 54b, 54d and which limit the extent to which lock arms 54a, 54c are able to flex away from axis 32. More specifically, one flex limiting strap 58 joins lock arm 54a to skirt segment 54b, one flex limiting strap 58 joins lock arm 54a to skirt segment 54d, one flex limiting strap 58 joins lock arm 54c to skirt segment 54b, and one flex limiting strap 58 joints lock arm 54c to skirt segment 54d. Each flex limiting strap is configured to elastically deform as its respective lock arm 54a, 54c is moved from a free state, i.e. not flexed as shown in FIG. 4 and on the left-hand side of FIG. 5, to a flexed state, as shown in the right hand side of FIG. 5, in which its respective lock arm 54a, 54c is able to clear first retention protuberance 44, shown as a dashed line for illustrative purposes, to allow assembly and disassembly of first seal retainer 22 from housing 18. As may be best seen in FIG. 4 and in the left-hand side of FIG. 5, when lock arm 54c is in the free state, flex limiting straps 58 as viewed in a direction parallel to axis 32 have a first portion 58a that is concave facing toward axis 32 which is flanked by second portion 58b and third portion 58c which are each concave facing away from axis 32. Alternatively, the concavity of one or more of first portion 58a, second portion 58b, and third portion 58c may be reversed and one or more of first portion 58a, second portion 58b, and third portion 58c may be omitted such that at least one portion remains that is concave, either facing toward axis 32 or facing away from axis 32. In this way, flex limiting straps 58 take the form of a pleat, and more particularly an accordion pleat, which expands when the respective lock arm 54a, 54c is flexed away from axis 32 and which contracts when the respective lock arm 54a, 54c returns to the free state. In order to ensure that flex limiting straps 58 are able to expand as necessary, flex limiting straps 58 have a wall thickness 58d in a direction normal to axis 32 that is less than a wall thickness 54e in a direction normal to axis 32 of each skirt segment 54a-54d. It should be understood that lock arm 54a has been selected for illustrative purposes and that lock arm 54c and flex limiting straps 58 associated therewith would have the same described characteristics as lock arm 54a and flex limiting straps 58 associated therewith. When lock arm 54a is moved to a flexed state as best seen in the right-hand side of FIG. 5, one or more of first portion 58a, second portion 58b, and third portion 58c elastically distort to permit lock arm 54a to flex away from axis 32, and importantly, limit the extent to which lock arm 54a is able to flex away from axis 32. While FIG. 5 does not show housing 18 in general, one first retention protuberances 44 has been illustrated in dashed lines in order to demonstrate that flexing of lock arm 54a is able to provide clearance from first retention protuberance 44 in order to permit assembly and disassembly. It should be understood that lock arm 54a has been selected for illustrative purposes and that lock arm 54c and flex limiting straps 58 associated therewith would have the same described characteristics as lock arm 54a and flex limiting straps 58 associated therewith. In this way, flex limiting straps 58 allow lock arm 54a and lock arm 54c to lift over their respective first retention protuberances 44 when first seal retainer 22 is being installed on housing 18 and when first seal retainer 22 is being removed from housing 18. However, flex limiting straps 58 prevent over-flexing of lock arm 54a and lock arm 54c, thereby ensuring reliable retention of first seal retainer 22 to housing 18. As used herein, over-flexing refers to the condition where the elastic limit of lock arm 54a or lock arm 54c is exceeded such that lock arm 54a or lock arm 54c does not return to its original free state after removal of force used to flex lock arm 54a or lock arm 54c away from axis 32.

First seal retainer 22 may be an electrically insulative material, and may be, by way of non-limiting example only, a synthetic polymer, for example nylon or PBT, which is net-formed by injecting a liquid polymer into a mold (not show) and then allowed to cool and solidify before being removed from the mold to yield first seal retainer 22 in finished form. Consequently all of the features described herein of first seal retainer 22 may be quickly and economically net-formed as a single piece of material.

While first seal retainer 22 has been illustrated as employing two lock arms, namely lock arm 54a and lock arm 54c which are arranged in an alternating pattern with skirt segment 54b and skirt segment 54d, it should be understood that a lesser number of lock arms or a greater number of lock arms may be used, depending on the retention needs of first seal retainer 22. By way of non-limiting example, skirt segment 54b and skirt segment 54d may be used as lock arms in the same way as lock arm 54a and 54c by merely providing housing 18 with additional first retention protuberances associated with skirt segment 54b and skirt segment 54d. Consequently, flex limiting straps 58 may extend between adjacent lock arms. Furthermore, while four skirt segments 54a, 54b, 54c, 54d have been illustrated, it should be understood that a lesser number or a greater number of skirt segments may be utilized where an appropriate number of the provided skirt segments are employed as lock arms to meet the retention needs of first seal retainer 22.

With the exception of accommodating only third wire 16, as opposed to first wire 12 and second wire 14, second seal retainer 26 is substantially the same as first seal retainer 22. Consequently, for brevity, second seal retainer 26 will not be described further herein, and it should be understood that the description of the features and properties of first seal retainer 22 are equally applicable to second seal retainer 26 for use in engaging second retention protuberances 46 to accommodate retention of second seal retainer 26 to housing 18.

While this invention has been described in terms of preferred embodiments thereof, it is not intended to be so limited, but rather only to the extent set forth in the claims that follow.

We claim:

1. A wire harness assembly comprising:
a housing defining an interior volume which extends into said housing along an axis, said interior volume having an interior surface having an interior perimeter, said housing also defining an outer surface having a retention protuberance extending outward therefrom;
a seal received within said interior volume which engages said interior perimeter of said interior surface, said seal having a wire aperture extending therethrough;
a wire extending through said wire aperture of said seal such that said wire aperture circumferentially engages said wire; and
a seal retainer having a seal retainer wall which traverses said axis and which retains said seal within said interior volume, said seal retainer also having a seal retainer skirt which is defined by a plurality of skirt segments which extend from said seal retainer wall such that each of said plurality of skirt segments is positioned laterally to said outer surface; wherein one of said plurality of skirt segments defines a lock arm having a lock aperture which captures said retention protuberance therein, thereby retaining said seal retainer to said housing and limiting motion of said seal retainer relative to said housing along said axis, said lock arm being resilient and compliant which allows said lock arm to flex away from said axis, thereby allowing said lock arm to lift over said retention protuberance when said seal retainer is being installed on said housing and when said seal retainer is being removed from said housing, said seal retainer having a flex limiting strap joining said lock arm to an adjacent one of said plurality of skirt segments which limits the extent to which said lock arm flexes away from said axis.

2. A wire harness assembly as in claim 1, wherein said flex limiting strap is a first flex limiting strap joining said lock arm to a first adjacent one of said plurality of skirt segments, said seal retainer also having a second flex limiting strap joining said lock arm to a second adjacent one of said plurality of skirt segments such that said first flex limiting strap and said second flex limiting strap limit the extent to which said lock arm flexes away from said axis.

3. A wire harness assembly as in claim 1, wherein:
said lock arm is flexible between a free state in which said retention protuberance is captured within said lock aperture and a flexed state in which said retention protuberance is not within said lock aperture; and
said flex limiting strap as viewed in a direction parallel to said axis when said lock arm is in said free state has a first portion that is concave facing toward said axis.

4. A wire harness assembly as in claim 3, wherein said flex limiting strap as viewed in a direction parallel to said axis when said lock arm is in said free state also has a second portion that is concave facing away from said axis and a third portion that is concave facing away from said axis such that said first portion is located between said second portion and said third portion.

5. A wire harness assembly as in claim 4, wherein when said lock arm is in said flexed state, at least one of said first portion, said second portion, and said third portion is distorted compared to when said lock arm is in said free state.

6. A wire harness assembly as in claim 3 wherein when said lock arm is in said flexed state, said first portion is distorted compared to when said lock arm is in said free state.

7. A wire harness assembly as in claim 1, wherein said flex limiting strap is a pleat which expands when said lock arm flexes away from said axis and which contracts when said lock arm returns toward said axis.

8. A wire harness assembly as in claim 1, wherein:
said flex limiting strap has a first wall thickness in a direction normal to said axis; and
said lock arm has a second wall thickness in a direction normal to said axis such that said first wall thickness is less than said second wall thickness.

9. A wire harness assembly as in claim 1, wherein said flex limiting strap limits the extent to which said lock arm flexes away from said axis so as to not exceed an elastic limit of said lock arm.

* * * * *